May 9, 1933.     G. CAMPBELL     1,907,735
LIQUID LEVEL REGULATION
Filed Aug. 3, 1931     2 Sheets-Sheet 1
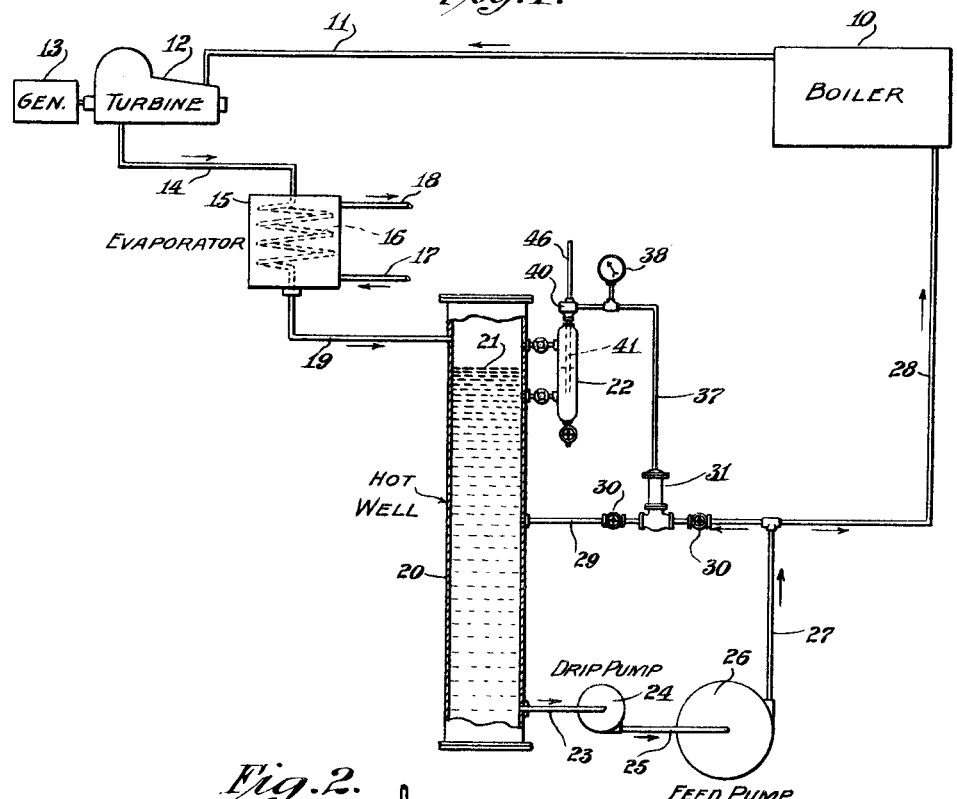
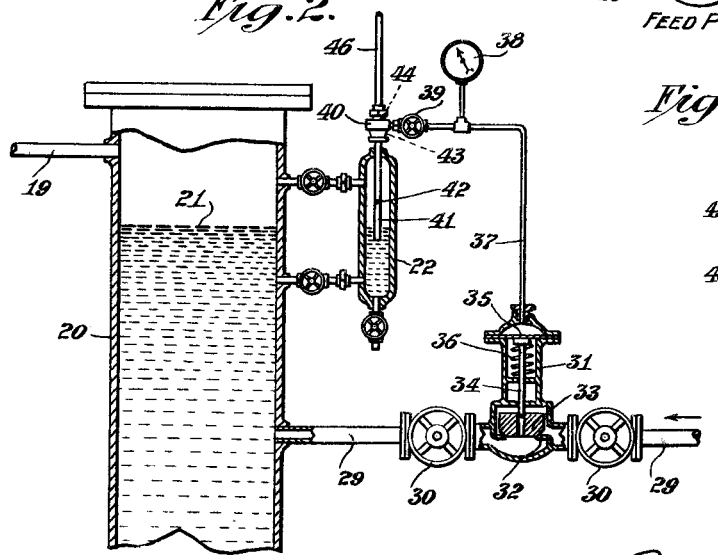
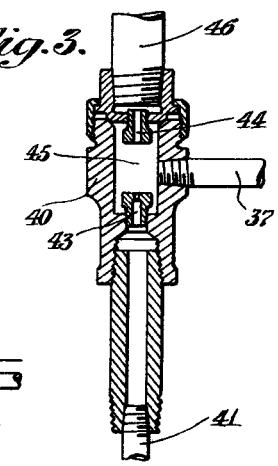
INVENTOR:
Grant Campbell
BY
Morrison, Kennedy & Campbell
ATTORNEYS.

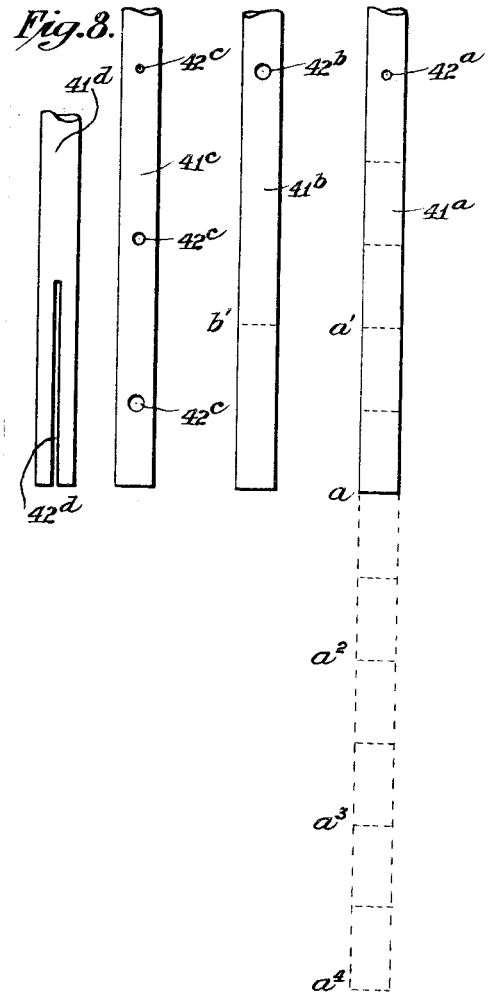
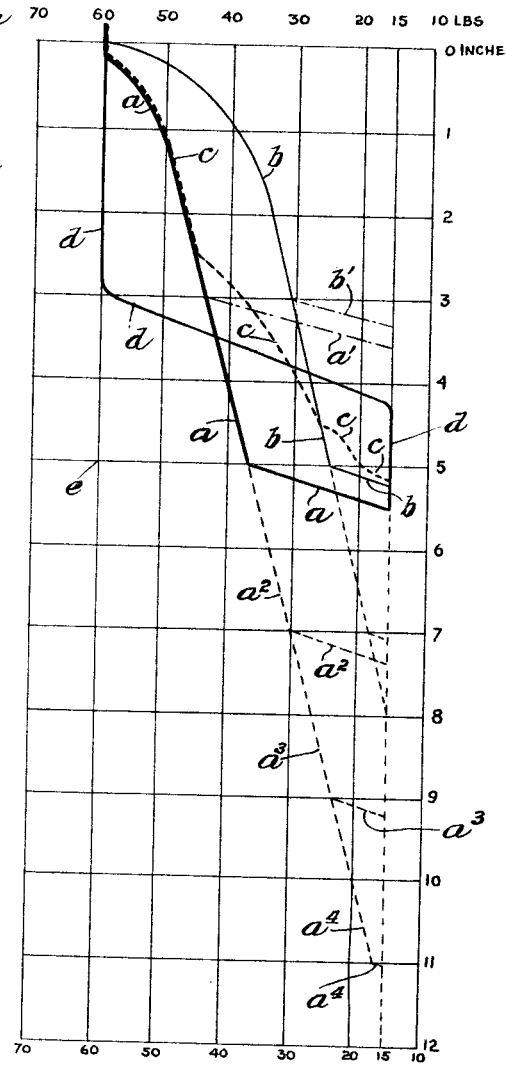

Patented May 9, 1933

1,907,735

UNITED STATES PATENT OFFICE

GRANT CAMPBELL, OF SHORT HILLS, NEW JERSEY

LIQUID LEVEL REGULATION

Application filed August 3, 1931. Serial No. 554,696.

This invention relates to liquid level regulation, and is directed more particularly to the maintaining of a uniform, regular or safe level of liquid, such as water, in various sorts of vessels, typically represented by boilers, hot wells and the like, comprised in systems dealing with hot water and steam, and whether the regulation is by varying the rate of water fed into or fed from the vessel, and whether such feed be continuous or intermittent as by trap means.

A prior example of liquid level regulating means of the same class as the present invention is my Patent No. 1,697,342 of January 1, 1929, disclosing features of control which in part are employed in the present invention as illustrated. Another example is the boiler feed water regulation apparatus of my co-pending application Serial No. 156,721, filed December 23, 1926, of which the present application, in a certain broad aspect, is a continuation in part.

The general object of the invention is to maintain a uniform, regular or safe water level in boilers, hot wells or other vessels by a mode of regulation affording a controlled smooth response to changes of level and a restoration in a prompt, efficient and practical manner to the desired normal level, which is not necessarily a fixed normal, but may advantageously vary somewhat for example, in a boiler, with a change of load. Other and further objects and advantages of the invention will be pointed out in the following description of an illustrative embodiment thereof or will be understood to those conversant with the subject. To the attainment of the objects and advantages referred to, the present invention consists in the novel liquid level regulation method and apparatus, and the novel features of operation, combination and construction herein illustrated or described.

In the accompanying drawings Figure 1 is a diagram of an installation comprising boilers, hot wells and other units, shown generally in sectional elevation, and with the present invention applied to the regulation of the water level in the hot wells.

Fig. 2, on a larger scale, shows a portion of Fig. 1 in greater detail, including part of the hot well and associated control means.

Fig. 3, on a still larger scale, shows in sectional elevation certain details of Figs. 1 and 2 including the orifice system or element and the three pipes or passages connected therewith.

Fig. 4 is an enlarged view of the sampler pipe or uptake of Figs. 1-3, with dotted extension and cross lines indicating variations in length thereof.

Fig. 5 is a diagram of action, showing the practical operation of a regulator having a sampler pipe such as illustrated in Fig. 4; also those of Figs. 6, 7 and 8.

Fig. 6 is a view similar to Fig. 4 showing a sampler pipe with larger perforation.

Fig. 7 shows another form of sampler pipe or uptake with a series of vertically spaced perforations, and such perforations of graduated sizes.

Fig. 8 shows a similar uptake, but with a continuous slot or kerf as in said application 156,721 instead of a series of perforations or holes.

Referring first to the general assemblage of apparatus shown in Fig. 1, a boiler 10 is indicated diagrammatically. This may represent a boiler of any type, with furnace, and the boiler may for example comprise in its upper part a superheater and in its lower part an economizer, which however are not shown because constituting no part of the present invention. From the boiler 10 steam is delivered by steam main 11 to any sort of prime mover or other apparatus 12, such as a steam turbine, directly coupled to a driven generator 13. From the exhaust of the turbine extends an exhaust pipe 14, and the steam delivered through this may be utilized in an evaporator 15 containing a coil 16 into which the pipe 14 delivers. This steam for example may be at 300 lbs. A pipe 17 is shown leading to, and a pipe 18 from the evaporator, these for conducting water or any other liquid through the apparatus for evaporation of such liquid. So far as the exhaust steam is concerned, the evaporator acts as a condenser, and the condensate is shown as conducted by pipe 19 into a hot well 20. It will be understood of course that any units of apparatus shown or described may be arranged in multiple, and the hot well 20 may represent a series of hot wells, separate or interconnected, receiving the condensate from one or more boilers, turbines, etc., and furnishing hot water to be fed back to the boiler or boilers, thus constituting a closed circuit of water and steam.

Within the hot well 20 hot water is shown as standing at the desired normal level 21, and the pressure upon it may vary, for example between 250 and 300 lbs. per sq. in. As well understood, while a certain small variation in level is permissible, it would be disadvantageous or dangerous to permit the hot well water level to drop to any considerable extent, or for that matter to rise substantially, and the present invention is herein employed to maintain in the hot well substantially the normal level 21, notwithstanding that the hot well may be relatively small, as 18 inches in diameter. At one side of the hot well suitably connected by steam and water pipes is shown a water column 22 of usual type, and the height of water therein may be made visible by the usual gage glass, indicating the height of water in the hot well.

Completing the main circuit of fluid flow a water outlet pipe 23 is shown near the lower end of the hot well leading to suitable pumping means, for example first to a so-called drip pump 24. This pump for example may deliver the hot water at a pressure of say 600 pounds, through delivery pipe 25, which in turn leads to the inlet of the main or boiler feed pump 26. The pump 26 may deliver water, for example at between 1500 and 1800 pounds pressure through outlet pipe 27 and thence pipe 28 leading back to the boiler 10, the boiler for example being one adapted to deliver steam at say 1250 pounds to the turbine. A closed fluid circuit has thus been described, but without suitable regulation it is obvious that the forwarding pumps, which preferably operate at constant speed, might over supply the boiler and drain excessively the hot well, or vice versa. When the condensate runs low the head is reduced and impairs the operation of the pumps or subjects them to failure. If the level rises too high the efficiency is impaired of the evaporator, and even of the turbine. There may of course be a separate hot water capacity to make up deficiences or receive surpluses.

By the present invention the hot well water is maintained substantially at the normal level 21, and all excess water received therein is forced back into the boiler, while tendency to deficiency is made up from a pipe feeding to the boiler or another source. This regulation is accomplished herein, preferably not by regulation of the pumps 24 or 26, but by means of a by-pass pipe 29 leading back from the boiler feed pipe 27 into the hot well, the pipe 29 containing a couple of hand valves 30 for shutting off the by-pass, and a control valve 31 between them by which the rate of by-pass return of water to the hot well is automatically regulated and varied, to maintain the desired level. Each hot well should have a separate by-pass and control valve unless connected to stand at the same level.

The automatic regulating or control valve 31 may be of various types, for example as in said patent, or application 156,721, but I prefer the valve shown in detail in Fig. 2, operating on the principles of my copending application Serial No. 375,507 filed July 2, 1929. Within the valve is shown a fixed seat or port 32 opened and closed by a perforated conical gate or disk 33, which may be loose and the movements of which are controlled by a pilot device comprising a rod 34, its lower end adapted to close or open the gate perforation, and its upper end attached to and moved by a pressure responsive device or diaphragm 35 loaded and modified in action by a spring 36. Accurate control of by-pass flow is afforded, the valve taking a predetermined adjustment for each water level in the hot well. Decrease of water level and of pressure above the diaphragm 35 causes the lifting of the pilot rod or stem 34, which is followed closely by lifting of the plate 33, increasing the by-pass flow, and vice versa. The gate is adjusted by the by-pass pressures above and below it, under control of the pilot, the movements of which merely open or close more or less the flow through the gate perforation, the gate being always in balance, closing tightly at extreme high water in the hot well, and opening wide at extreme low water level; this type of valve giving accuracy of operation with widely varying loads, and giving the benefits of the so-called balance type of valve while retaining those of a tight closing single seat valve.

The chamber above the diaphragm 35 is shown as fed with regulating pressure by a pipe 37 in which is inserted a pressure gage 38 to indicate the conditions therein, and as well a hand valve 39 by which the control pressure can be shut off when desired. The controlling pressure conducted by pipe 37 to the diaphragm 35 is a variable pressure existing within an orifice unit or device 40 fed from below by an uptake pipe or ascending sampler 41, having one or more lateral apertures or perforations 42, and the orifice element having a first or lower orifice member 43 and a second or upper orifice member 44, the orifices being preferably of increasing sizes, and forming a control pressure chamber 45 between them, and the second orifice delivering through a pipe 46 to atmosphere or an open tank or well or other place of low pressure, the depressed or intermediate pressure in the orifice chamber being the controlling pressure that operates the diaphragm of valve 31.

The ascending sampler pipe 41 is dipped into the hot well water, for example through a fitting at the top of the water column 22. The open lower end of the pipe stands somewhat below the desired average or normal water level while the perforation 42, or some part of the lateral apertures when of other form, is above the desired level. This pipe affords a continuous upflow to the orifice system, its composition varying with the hot well level. When extremely low only steam will ascend and traverse the orifice system. When extremely high only hot water will ascend. The first affords minimum regulating pressure in the chamber 45 and the latter maximum pressure, while between these extremes the moisture content will increase with the level, thereby affording corresponding changes of regulating pressure, to be transmitted to the diaphragm valve 31.

In principle, while the orifice 43 admits the fluid to the chamber 45, and the orifice 44 passes fluid continuously to the atmosphere, the resulting pressure will vary with the percentage of moisture, upon the principle that the moisture, or hot water, tends to flash into steam at the reduced pressure, thus enhancing the pressure, whereas steam alone is naturally restricted in entering the chamber, affording a much lower regulating pressure. The first and second orifices should be scientifically proportioned, so that as the fluid or mixture traverses them to the atmosphere the chamber pressure will increase in a predetermined manner with increase of moisture content and vice versa; with the result that rise or fall of water level in the hot well results in a different regulating pressure for each level and therefore a predetermined adjustment of the diaphragm valve 31 for each pressure and level. In other words the valve opening or closing alters closely with the changes of level.

In some cases the sampler tube or outtake may be reversed by extending it downwardly instead of upwardly through the vessel wall to the orifice system or other regulating means responsive to variations in proportions of liquid and vapor, while retaining the vertically spaced inlets both below and above the liquid level; this being less desirable and not preferred in that gravity does not restrain the outflow of liquid through the tube but works against this advantage elsewhere noted, although gravity flow into the downtake will vary the moisture content with the liquid head above the inlets and so afford control.

The regulating apparatus hereof may be briefly redescribed as involving a vessel containing hot liquid and vapor under pressure, with a liquid duct or pipe 29 and a valve, pump or other control means therein for adjusting the flow into or from the vessel, the regulating apparatus being of the type which comprises an orifice system with tandem orifices and vaporization chamber between, an outtake or tube conducting liquid or vapor or both from the vessel to the orifice system, and a pressure responsive device to which the chamber pressure is applied and which adjusts the control means or valve to correct variations or departures in the liquid level; this much of the apparatus being substantially the basic invention disclosed in said prior patent, but the present improvement being characterized in several respects, including that the outtake tube has its lower end normally immersed in the liquid in the vessel and ascends therefrom to the orifice system, and characterized additionally in that the outtake tube is formed with a lateral aperture, perforations or slot, normally above, or extending above, the liquid level to admit vapor from the vessel to the outtake tube, whereby variations of level from the normal cause progressive variation of liquid and vapor proportions ascending to the orifice system and thereby progressive variations of chamber pressure adapted to adjust the control means or valve to restore the normal level in the vessel. The term control means is herein intended to include not only a valve controlling the flow but a regulable pump or head permitting control thereof.

The action and advantages of the invention can be explained more clearly by reference to the diagrams. Referring to Fig. 4 the uptake or sampler tube 41$^a$ may represent a pipe of ¼ inch inside diameter and the perforation 42$^a$ may be 5 inches higher than the bottom end of the tube, the inches being marked on the tube for convenience. The first and second orifices should be proportioned so that with a hot well pressure of 300 pounds, the orifice chamber pressure will vary between a maximum of 60 pounds with extremely high water and a minimum of 15 pounds with extremely low water; these figures of course being mere examples to indicate the principles. The normal water level may be for example at the point $a'$, somewhat below the medium point between the tube bottom and the perforation. Suitable orifice areas for the first and second orifices described are .00126 and .0127 square inches respectively. The inlet hole 42$^a$ may be of #40 drill size, or .098 inch diameter.

Fig. 5 is a pressure curve. The vertical divisions represent inches of water level below the perforation 42$^a$ and the horizontal divisions are pressures in pounds per square inch. With an uptake tube as in Fig. 4 the pressure curve is represented by the lines $a$—$a$—$a$. When the water is up to the perforation the chamber pressure is 60 pounds or a maximum. When the level drops 1 inch the pressure is about 50 pounds, at 2 inches about 47 pounds, at 3 inches about 44 pounds, at 4 inches about 40 pounds, at 5 inches about 37 pounds, it requiring about ½ inch additional drop in level for the pressure to reach the minimum of 15 pounds, due to the fact that the continuous entrance of vapor into the bottom end of the tube induces the entrance of substantial quantities of moisture so long as the space between the water level and the tube is under ½ inch. The pressures indicated by the curve a—a—a are approximately those obtained by actual test by gage or pressure recorder, representing the pressure in the chamber of the orifice system, which pressure is greater with higher level of water and greater percentage of moisture, and vice versa, and is communicated to be applied to the pressure responsive device or diaphragm of the valve or means which controls the liquid duct and thereby adjusts the rate of liquid flow to restore the liquid level in the vessel.

Pressure herein is referred to as gage pressure, or pounds above atmospheric; and the pressures and other figures given as examples are on the basis of a plant operating under certain conditions of pressure and load, to be suitably altered under different conditions.

The moisture content of the steam rising in the uptake increases progressively with rise of water level in the vessel or hot well between minimum and maximum, and the following is believed to be the explanation, while the results have been established by actual test, as demonstrated on the diagrams explained hereinbelow. The opening at the uptake tube bottom together with all inlets thereabove constitute the total inlet area. As soon as the water rises to submerge the tube bottom opening the total steam admission area into the tube space is greatly reduced. The steam entering the tube above the water level rises with velocity to the orifice system. There is continuous steam flow to and through the orifice system, therefore due to the reduced steam inlet area to the tube, restricting the inflow, there is substantially reduced pressure in the tube. The velocity upflow of steam creates an induced suction and depressed pressure above the hot water level within the tube space. This operates to raise the interior to above the exterior water level. The interior level rise is a function of the pressure drop and water density within the tube. To illustrate, with the vessel at 100 lbs. absolute pressure, hence specific volume of .018 cu. ft. per lb., a pressure drop within the tube of 0 1 lb. will cause 3 in. relative rise of water in the tube. The reduced interior pressure further operates to increase ebullition in the tube, and thereby the ease of detachment of particles of water or moisture. Water bubbles rise as wet steam to an appreciable height above the interior level, and this action increases with rise of interior level, and is enhanced by the increased interior ebullition, due to the interior column being subjected to the higher temperature communicated from the steam in the vessel. By reason both of the increased interior level and ebullition the quantity of water elevated, detached and entrained with the outgoing steam is greater with higher water level and vice versa; more moisture comes into the zone of influence of the velocity flow into and up through the tube. When there are successively spaced inlets into the tube a similar series of actions take place progressively as each inlet is submerged and put out of action. When a kerfed outtake tube is used an additional entraining action occurs in that the steam entering under velocity contacts directly the upstanding water column in the tube and bodily detaches and lifts solid water to the orifice system, which action rapidly increases up to the maximum.

The diagram therefore clearly establishes that variations of liquid level from the normal cause progressive variations of the controlling pressure existing in the vaporization chamber, rendering it a simple matter to design and adjust the control valve 31 to respond accordingly. Each liquid level between maximum and minimum involves a corresponding control pressure and valve adjustment. It will be noted from the curve of Fig. 5 that relatively small variations, within an inch or two, cause relatively small changes in control pressure, but that any extensive departure of level therebeyond causes a more abrupt change of control pressure, tending more promptly to bring the liquid level back to or approximately to the desired normal level.

The described system in operation is quite flexible and adaptable in varying conditions. Thus if it is desired to have a shorter range of level variation than 5 inches, the tube 41$^a$ Fig. 4 could be cut off at the dotted line $a'$. The pressure curve would then start down along the line $a$ as already described, but at the 3 inch point would incline directly over to the 15 pound line as at $a'$ on Fig. 5. On the other hand if greater latitude is desired the perforation 42$^a$ may be placed for example 7 inches above the tube bottom, or the tube continued to the line $a^2$. The pressure curve $a$—$a$ then would be continued as at $a^2$—$a^2$. If the tube be extended 2 inches further, to the length $a^3$ the pressure curve will be continued as indicated at $a$—$a^2$—$a^3$—$a^3$. If the tube be lengthened to $a^4$ the curve will be extended as at $a^4$—$a^4$. The valve-controlling pressure changes may thus be extended over any desired range with resulting improved accuracy of valve adjustment.

The character and incline of the pressure curve can, on these principles, be predetermined quite closely in accordance with desired conditions. Fig. 6 shows an uptake tube 41$^b$ with a perforation 42$^b$ much larger than the perforation 42$^a$, for example No. 25 drill, or diameter .15 inch. The pressure curve then will commence at 60 pounds and terminate at 15 pounds as before, but instead of the curve $a$—$a$—$a$ the pressure will be governed by the curve $b$—$b$.

Fig. 7 shows a variation of sampler tubes 41$^c$ wherein the single perforation is replaced by successive perforations 42$^c$ at different levels, graded in sizes, for example No. 20 drill, diameter .161, No. 30 drill, diameter .1285, and No. 40 drill, diameter .098. The pressure curve $c$—$c$—$c$ on Fig. 5 will correspondingly extend in several sections, the first corresponding substantially with a part of curve $a$, the second having a greater degree of incline and the third a still greater degree. This embodiment affords greater control pressure changes for the same degrees of variation from normal level.

A plain sampler tube, without any perforation or other inlet than the open end of the tube would provide a relatively inefficient action of regulation; and would give a curve extending for example down the 60 pound line clear to the point $e$ reaching the lower end of the tube, and thence off at a slight slant to the 15 pound line. The several other forms of regulation indicated on the diagram give a different sort of control of the feed valve and render its action much more accurately adjustable.

Fig. 8 shows an uptake tube 41$^d$ in which the succession of perforations is replaced by a narrow longitudinal slot or kerf 42$^d$, or one at each side, for example a kerf $\frac{1}{32}$ inch wide, 2½ inches long, a one side only. This will afford a pressure diagram of the character indicated by the curve $d$—$d$. Since however part of the slot 42$^d$ is continuously submerged it is somewhat apt to accumulate deposits of foreign matter or scale and become gradually blocked or altered in dimensions, and capillarity may disturb the action. These defects are less true of the tube of Fig. 7 since the perforations are of greater width than the slot in Fig. 8 and in effect represents sections of slot concentrated as perforations. The tube of Figs. 4 and 6 are preferred to those of Figs. 7 and 8 since the perforations are confined to the vapor space of the vessel and are of substantial size and substantially free from clogging. The perforated forms have the decided superiority over the slotted forms that the pressure variation range is substantially increased for similar area of inlet, as clearly shown by the diagram Fig. 5.

The following further considerations are noted. The sampler or uptake is an ascending tube, inserted from above in the water column, requiring up-travel opposed by gravity to reach the orifices. Since the water level is determined by the position of the water inlet at the lower end of the tube, in conjunction with any steam inlet at a higher point, it is only necessary, if the normal water level is desired to be altered, to adjust the tube up or down. The control pressure pipe 37 carries no flow but only communicates pressure, wherefore any fluid, as cold water, may occupy the pipe or that part of it adjacent to the diaphragm 35, which, being thus shielded from steam may be composed of rubber. The spring 36 modifying the diaphragm action assists the valve in assuming a predetermined position for each pressure, and the spring may be adjustable as in said patent to allow correct initial setting. Or springs may be employed having different values so as to effect the full travel of the valve over a greater or less range of level change or of diaphragm pressure change.

This invention can regulate level in a boiler or any similar vessel, and by control of feed either to or from the vessel as circumstances require. The system illustrated involves continuous inflow of hot water into the hot wells from the turbines but at irregular rates, and what the illustrated system really does is to vary the net outflow from each hot well to maintain its proper level. This is done by a constant speed pump extracting more water than the maximum inflow, associated with a by-pass back to the well, reducing the net outflow, under control, to balance the inflow and maintain the level. A regulable outflow pump or source of head would give the same result without by-pass, if controlled by this invention; or the invention could be used instead at the boiler to maintain the best level therein, or at both the hot well and boiler if an intermediate water storage of variable capacity be introduced, e. g. between two pumps. The uptake tube of this invention, with inlets both below and above normal water level, cushions or renders more gradual the pressure changes in the orifice chamber, and minimizes any impairing effect of surging in the vessel. The term orifice is herein used to include any available restricted progressive flow or escape, whether a single perforation, or several, or a multiplicity, or even a working device or escapement, so that the flow restriction is definite in character; and while two orifices in tandem are shown there may be three or more, with chambers between each two, and the control pressure taken off at any chamber.

The apertured sampler or ascending uptake pipe hereof, that is having inlets both below and above the liquid level, in a broad aspect, is of practical value aside from the particular combination shown involving an orifice system with intermediate pressure taken off for control. In this aspect the apertured sampler pipe hereof is useful for the purpose of varying the moisture content of steam or vapor in accordance with the depth of submergence or the level of the liquid, for various purposes; this sample having substantial advantage over a simple outtake pipe or side outlet in that progressive changes or proportion of liquid and vapor extend over a considerable range of level, so that the change from maximum or all liquid to minimum or all vapor is even and gradual rather than sudden. Examples illustrating such scope of the invention include various cases wherein continuous flow through the sampler is maintained, the liquid and vapor so drawn from the vessel effecting some suitable control or operation. Thus the sampler of this invention may be used as an uptake carrying steam or a mixture from the boiler to the steam end of a feed pump, feeding for example back to the boiler. With minimum level and dry steam the pump will operate at maximum capacity. With maximum level and only water ascending through the sampler the pump may cease operation. With this invention, at intermediate levels, the percentage of moisture will vary in a manner to vary the speed of operation of the pump, so that the pump may continue in operation at varying speeds, rather than operating for a time at maximum speed and then wholly ceasing operation.

A second instance is that of a boiler or vessel fed with water by a tilting feed trap. When the trap tilts the connection of the sampler pipe thereto is opened, and if the level be low vapor will ascend to the trap, thus allowing water to flow by another communication from the trap to the vessel; while with high level water ascends the sampler, preventing feed of additional water to the vessel. With the apertured sampler pipe hereof the varying proportions of moisture ascending through the sampler will afford varying degrees of operation of the trap. Another example is the outfeed by the sampler direct to a trap which, if it receives water, will tilt and discharge, the hot water evaporating and raising the pressure on the diaphragm of a feed valve to control the flow to the vessel. The use of the perforated sampler gives a more even operation, avoiding the extremes of fully open or closed valve. A similar result follows with the use of a trap of the thermostatic or expansion type, adapted to a more or less continuous discharge with accumulation of water. With either type of trap a restriction of some character should follow the trap so that a variable pressure is induced for the purpose of operating the control valve. In some cases, even without evaporation following the trap, the flow of water may, due to the restriction or orifice, cause increased pressure between the trap and the restriction to operate the valve. Another example is the operation of a hot water level indicator, assuming substantially constant steam pressure in the vessel, and a pipe such as in Fig. 4, considerably extended, the control or depressed pressure can operate a gage, which may be remote, to show or record the level.

There has thus been described an apparatus for regulation of liquid level embodying the principles and attaining the objects of the present invention. Since many matters of operation, combination and construction may be variously modified without departing from the principles, it is not intended to limit the invention to such matters except to the extent set forth in the appended claims.

What is claimed is:

1. Apparatus for regulating the liquid level in a vessel adapted to contain hot liquid and vapor under pressure, with a liquid duct having a control means or valve for adjusting the flow into or from the vessel, the same comprising an orifice system with tandem orifices and vaporization chamber between, an outtake or tube conducting liquid or vapor or both from the vessel to the orifice system, and a pressure responsive device to which the chamber pressure is applied and which adjusts the control means to correct variations in liquid level; characterized in that the outtake has its open lower end normally immersed in the liquid in the vessel and ascends therefrom to the orifice system and is formed with a lateral aperture normally above or extending above the liquid level to admit vapor to the outtake, whereby variations of level from the normal cause progressive variation of liquid and vapor proportions ascending to the orifice system and thereby progressive variations of chamber pressure to adjust the control means to restore normal level.

2. In liquid level regulating apparatus of the kind described, the combination, with an orifice system and a pressure responsive device operated by the pressure therein to effect regulation of level in a vessel, of an uptake having inlets both below and above the normal liquid level within the vessel and delivering to the orifice system a mixture of liquid and gas in proportions varying with the liquid level.

3. Apparatus as in claim 2 and wherein the uptake inlets include a liquid inlet substantially below the normal level and near the minimum level and a separate vapor inlet substantially above the normal level and near the maximum level, whereby variations of level between minimum and maximum cause corresponding variations in orifice system pressure.

4. In liquid level regulating apparatus of the kind described, the combination, with an orifice system and pressure responsive device operated by the pressure therein to effect regulation of level in a vessel, of an uptake having a liquid inlet below the normal liquid level within the vessel and a separate vapor inlet wholly located a substantial distance above normal level.

5. Apparatus as in claim 2 and wherein above the minimum level the uptake has a plurality of separate spaced inlets adapted to be reached successively as the water rises above minimum to maximum.

6. Liquid level regulation apparatus comprising means feeding liquid to or from a pressure vessel, an orifice system containing a vaporization chamber between orifices, an ascending outtake connection comprising a kerfed tube dipped in the vessel for conveying hot liquid and vapor from the vessel to the orifice system, a controller for the feeding means and a connection from the chamber to the controller whereby the variable depressed pressure in the chamber controls the feeding action.

7. Liquid level regulation apparatus comprising means feeding liquid to or from a pressure vessel, and a controller therefor, an orifice system containing a vaporization chamber between orifices, an ascending outtake connection for conveying hot liquid and vapor with upward flow directly from the vessel to a substantially higher level and thence to the orifice system, and a connection from the chamber to the controller whereby the variable depressed pressure in the chamber controls the feeding action; the outtake connection comprising an ascending passage having its lower end immersed and formed with a slot or communication having vertical dimension admitting hot liquid and vapor to the passage, thereby giving progressive variation of the proportions of liquid and vapor flowing to the orifice system.

8. Liquid level regulation apparatus comprising means feeding liquid to or from a pressure vessel, and a controller therefor, an orifice system containing a vaporization chamber between orifices, an ascending outtake connection consisting of a kerfed tube or passage dipped in the liquid and with its kerf extending longitudinally both above and below normal liquid level, for conveying hot liquid and vapor with upward flow directly from the vessel to a substantially higher level and thence to the orifice system, and a connection from the chamber to the controller whereby the variable depressed pressure in the chamber controls the feeding action.

9. In liquid level or flow regulating apparatus the combination with a pressure vessel, of an outtake having vertically spaced inlets located both below and above the liquid level in the vessel, whereby to furnish liquid and vapor in proportions corresponding to variation of level, and regulating means responsive in action to variations in such proportions.

10. Apparatus for regulating the liquid level in a vessel adapted to contain hot liquid and vapor under pressure, with a liquid duct having a control means or valve for adjusting the flow into or from the vessel, the same comprising an orifice system with successive orifices and vaporization chamber between, an ascending outtake tube having its open lower end adapted to be immersed in the liquid in the vessel and rising directly therefrom to a substantially higher elevation, whereby to conduct liquid or vapor or both from the vessel with upflow through such tube and thence to the orifice system, and a pressure responsive device to which the chamber pressure is applied and which adjusts the control means to correct variations in liquid level; whereby variations of level from the normal cause variation of liquid and vapor proportions ascending to the orifice system and thereby progressive variations of chamber pressure to adjust the control means to restore normal level.

11. Liquid feed regulation apparatus for regulating liquid level in a pressure vessel, comprising an orifice system containing a vaporization chamber between orifices, an ascending outtake connection for conveying hot liquid and vapor with upward flow directly from the vessel to a substantially higher elevation and thence to an orifice of the orifice system, a liquid duct having a controller or valve for adjusting the flow therethrough into or from the pressure vessel to regulate the level in the vessel, and a connection from the chamber to the controller for adjusting the controller whereby the variable depressed pressure in the chamber controls the flow in the duct and thereby the level in the vessel.

12. Apparatus as in claim 11 and wherein the ascending outtake connection passes through the vapor space of the vessel whereby it is kept at high temperature.

13. Liquid level regulation apparatus comprising an orifice system containing a vaporization chamber between orifices, and an ascending outtake from a pressure vessel to the orifice system having a longitudinal slot or communication giving progressive variation of proportion of water flowing upwardly through the outtake and passing to the orifice system.

In testimony whereof, this specification has been duly signed by:

GRANT CAMPBELL.